United States Patent [19]

Macrander

[11] 3,829,790

[45] Aug. 13, 1974

[54] CLOCK DISTRIBUTION CIRCUIT

[75] Inventor: Max S. Macrander, Warrenville, Ill.

[73] Assignee: GTE Automatic Electric Laboratories Incorporated, Northlake, Ill.

[22] Filed: Sept. 14, 1973

[21] Appl. No.: 397,544

[52] U.S. Cl. ................ 331/61, 307/208, 331/116 R

[51] Int. Cl. .......................................... H03b 27/00

[58] Field of Search .................... 331/116 R, 60, 61; 307/208

[56] References Cited

UNITED STATES PATENTS 3,740,660 6/1973 Davies, Jr. ............................ 331/60

*Primary Examiner*—John Kominski

[57] ABSTRACT

A clock distribution circuit that generates consecutive timing pulses of a first predetermined time duration on a first plurality of output lines and a corresponding number of timing pulses of a second predetermined duration that is less than the first time duration on a second plurality of output lines. The leading edge of every timing pulse of the second time duration is nearly coincident with the leading edge of a corresponding timing pulse of the first predetermined duration. To generate the two sets of timing pulses, the clock circuit is provided with a crystal controlled oscillator, a phase feedback stage, a dual rank shift register, delay gating, feedback gating and feed forward gating arrangements.

7 Claims, 3 Drawing Figures

PATENTED AUG 13 1974 3,829,790

SHEET 1 OF 3

CLOCK DISTRIBUTION CIRCUIT

BACKGROUND OF THE INVENTION

1. Field of the Invention

The present invention relates generally to the field of digital data processing and more particularly to a clock distribution circuit having novel gating arrangements to produce timing pulse outputs and self inhibiting modes in the case of various failure modes.

2. Description of the Prior Art

In complex data processing systems and logic circuits such as central processing units, clock timing waveforms and various time related signals are required that exhibit precise timing relationships. Further, the clock distribution circuits that generate the precision timing pulse waveforms may cause erroneous data transfers and logic operations due to various failure modes in the clock circuity such as open or shorted gate leads.

OBJECTS AND SUMMARY OF THE INVENTION

Accordingly it is a principal object of the present invention to provide an improved clock distribution circuit that detects failure modes in its timing pulse outputs and inhibits further operation.

A further object is a clock distribution circuit that utilizes delay gating, feed forward gating and feedback gating arrangments to detect failure modes and inhibit the clock distribution outputs.

These and other objectives of the present invention are achieved by providing a crystal controlled oscillator stage whose outputs are coupled through phase feedback circuity means that provides the clock signals to a dual rank shift register. Each stage of the dual rank shift register has outputs that are coupled through a feedback and feed forward gating stage to generate the first and second timing outputs of predetermined pulse duration. Delay gating means are included to provide timing control to the feedback and feed forward gating means to accomplish the timing differential between the outputs of the first predetermined time duration or "place" outputs and the second output of shorter duration called the "accept level" outputs.

Other objects will appear from time to time in the ensuing specification, drawings and claims.

DESCRIPTION OF THE PREFERRED EMBODIMENT

Figure 1:
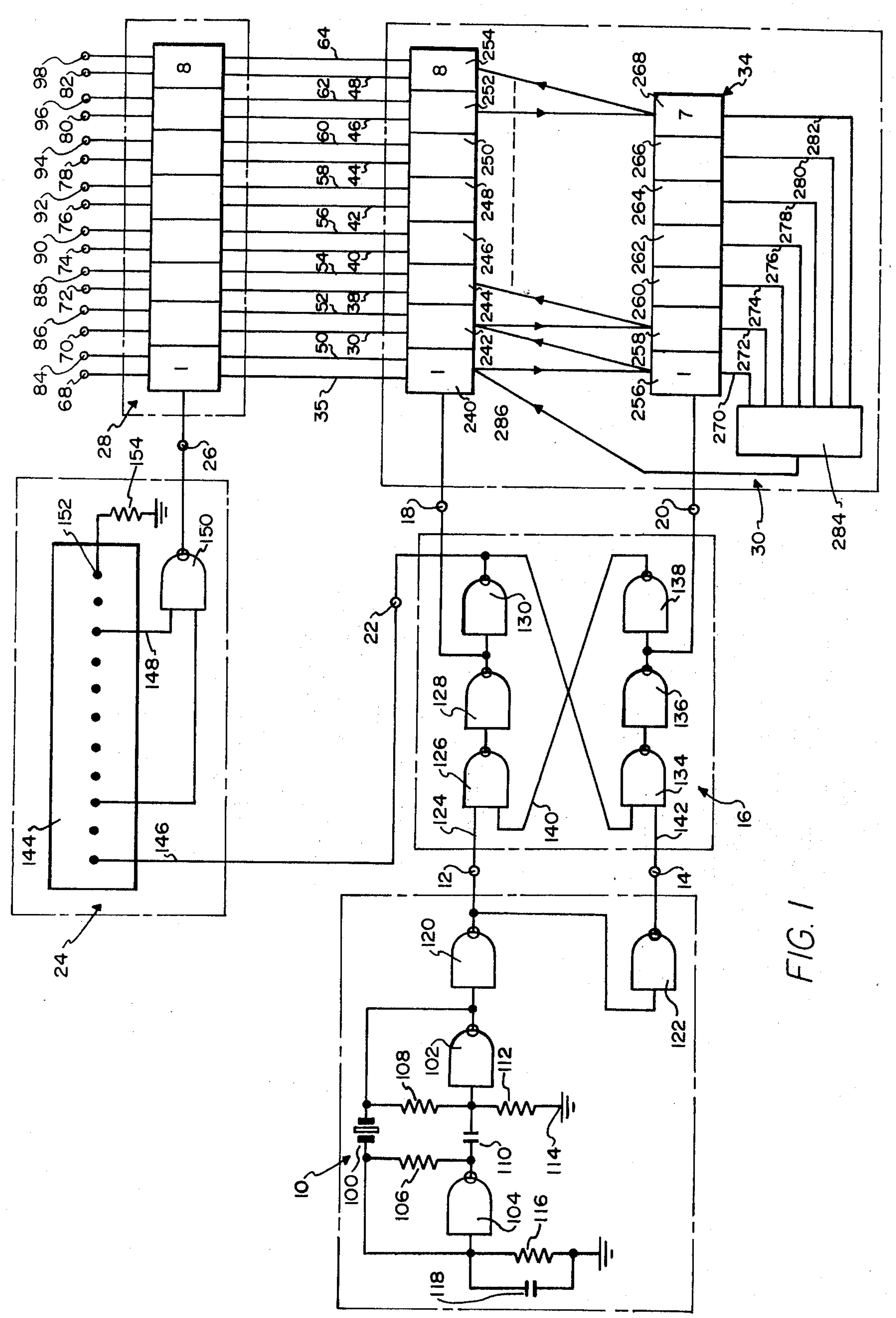
FIG. 1 is a schematic diagram of the clock distribution circuit of the present invention.
Figure 2:
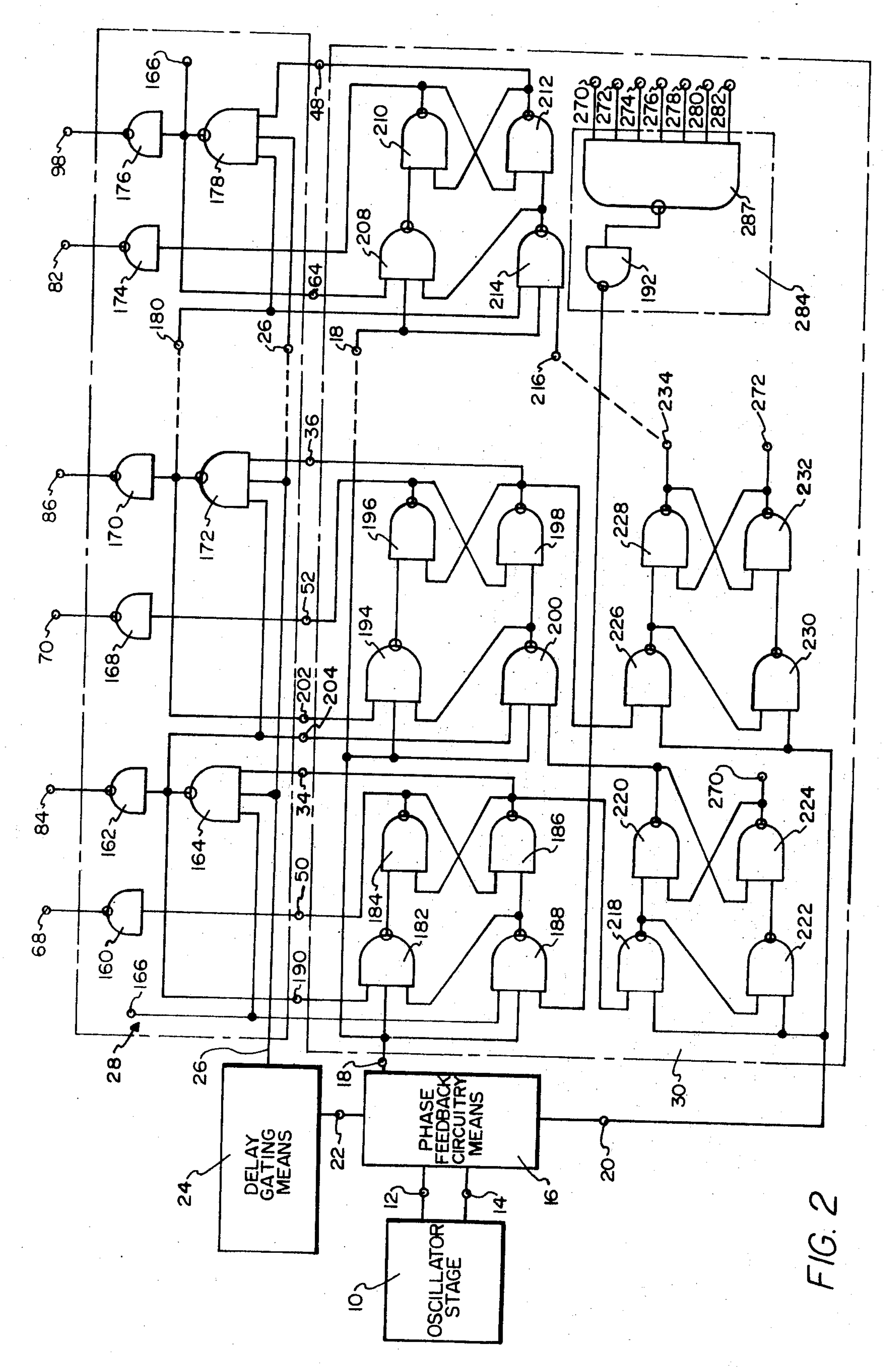
FIG. 2 is a schematic diagram showing the details of the dual rank shift register and feedback and feed forward gating means of the clock distribution circuit of FIG. 1.
Figure 3:
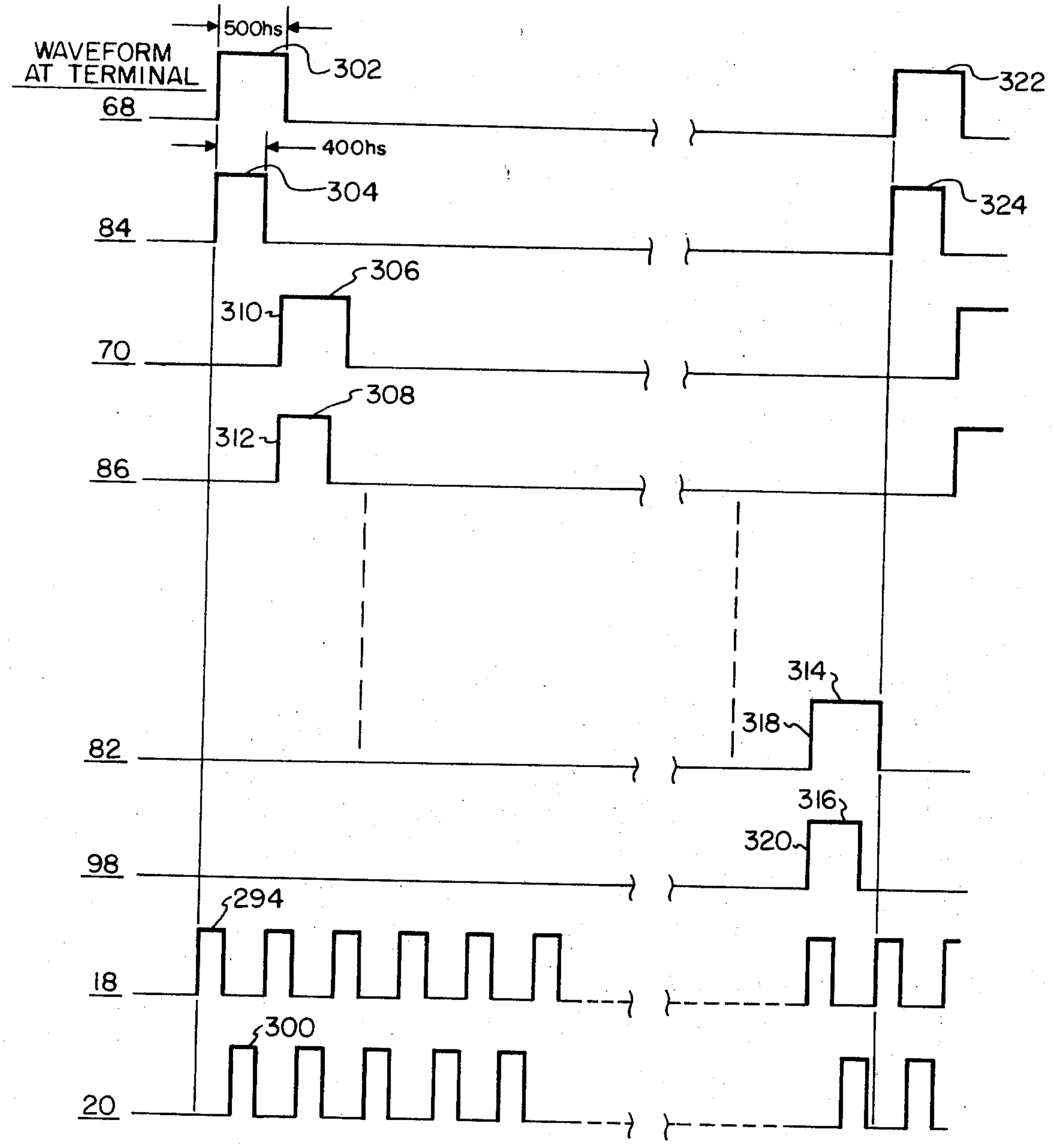
FIG. 3 is a timing diagram of various waveforms in the clock distribution circuit of FIGS. 1 and 2.

The clock distribution circuit of FIGS. 1, 2 and 3 utilizes a crystal controlled oscillator stage shown generally as 10 that includes two outputs 12 and 14 of 180° phase relationship that are coupled to phase feedback circuity means labeled generally 16 that provides clock outputs 18 and 20 that are also of inverse phase relationship. The phase feedback circuity means also provides for the mutual exclusivity of the clock outputs 18 and 20 for failure mode protection as will be explained in detail hereinafter. An output 22 of the phase feedback means 16 that is coupled to the delay gating means 24 is utilized in producing an output 26 of the delay gating means 24 is coupled to the feed forward and feedback gating means 28 to provide a timing signal that controls the time differential between the outputs of feedback and feed forward gating means 28.

The clock outputs 18 and 20 of phase feedback circuity means 16 are coupled to a dual rank shift register 30 that provides the sequential timing and shifting necessary to produce the timing waveforms of the clock distribution circuit. The dual rank shift register 30 includes an upper register 32 and a lower register 34 that cooperate to produce the sequential timing arrangement. The upper. register 32 of register stage 30 is comprised of 8 flip-flops that each have a Q output and a $\overline{Q}$ output. The Q outputs of the 8 flip-flops of register 32 are 34, 36, 38, 40, 42, 44, 46 and 48 respectively. The $\overline{Q}$ outputs of the flip-flops in register 32 are 50, 52, 54, 56, 58, 60, 62 and 64 respectively. Each of the Q and $\overline{Q}$ outputs of the flip-flops in register 32 are coupled to a correspondingly numbered stage in the feedback and feed forward gating means 28. Each stage of the feedback and feed forward gating means 28 then produces a first timing output of a predetermined time duration and a second output of a predetermined time duration shorter than the first time duration. The first plurality of outputs of the corresponding stages of the feed forward and feedback gating means 28 are 68, 70, 72, 74, 76, 78, 80 and 82 respectively. The second plurality of outputs of shorter time duration than the first outputs are 84, 86, 88, 90, 92, 94, 96 and 98 respectively. The first plurality of outputs 68 through 82 generate a train of 8 consecutive 500 nanosecond time pulses while the second outputs 84 through 98 generate a corresponding train of 400 nanosecond time pulses with the leading edge of every 400 nanosecond time pulse of the second set of outputs coinciding with the leading edge of each corresponding first output of 500 nanosecond time period. It should be understood however that time durations other than 500 nanoseconds and 400 nanoseconds may also be utilized.

The crystal controlled oscillator stage 10 includes a crystal 100 with 1 lead connected to the output of an inverter gate 102 and the second lead of crystal 100 connected to the input of an inverter gate 104. The output of inverter gate 104 is connected through a resistor 106 to the input of inverter 104 and the input of inverter gate 102 is connected to the output of inverter gate 102 through a resistor 108. A capacitor 110 is connected between the output inverter 104 and the input of inverter 102. A resistor 112 is also connected between the input of inverter gate 102 and ground 114. The input of inverter gate 104 is connected to ground through the parallel combination of a resistor 116 and a capacitor 118. The output of inverter gate 102 is connected to the input of an inverter gate 120 whose output is connected to the input of inverter gate 122 and which also forms the output 12 of oscillator 10. The output of inverter gate 122 forms the second inverse phase related output 14 of oscillator 10.

The first oscillator output 12 is connected to one input 124 of a two input NAND gate 126 of the phase feedback circuity means 16. The output of NAND gate 126 is connected through two inverter gates 128 and 130 with the output of inverter gate 130 forming the output 22 of the phase feedback circuity means 16. The input of inverter gate 130 forms the clock output 18 of the phase feedback circuity means 16. The output inverter gate 130 is also connected to an input 132 of a two input NAND gate 134 whose output is connected through the series connection of inverter gates 136 and 138 to the second input 140 of NAND gate 126. The input of inverter gate 138 also forms the output 20 of the phase feedback circuity means 16. The second input 140 of NAND gate 134 is connected to the oscillator output 14.

The delay gating means 24 includes a delay line element 144 with an in ut connected to the output 22 of the phase feedback means 16. Two outputs 146 and 148 of the dealy line element 144 are connected to the inputs of a two input NAND gate 150 whose output forms the output 26 of the delay gating means 24. The delay line element is terminated at output 152 with its characteristic impedence by a resistor 154 whose other end is connected to ground 114.

Referring now to FIG. 2, feed forward and feedback gating means 28 in its first stage includes an inverter gate 160 whose output forms the output 68 and whose input is input 50 which is coupled to the upper register 32 of dual rank shift register 30. The output of an inverter gate 162 forms the output 84 with its input being connected to the output of a three input NAND gate 164. One input of NAND gate 164 is connected to the output 34 of upper register 32. A second input of NAND gate 164 is connected to an output 166 of the eight stage in feedback and feed forward gating means 28 and a third input is connected to the output 26 of delay gating means 24. The second stage of the feedback and feed forward gating means 28 similarly includes an inverter gate 168 whose output is the output 70 and whose input is the Q output 52 of upper register 32. The output of an inverter gate 170 forms the output 86 and the input of inverter gate 170 is connected to the output of a three input NAND gate 172 which has a first input connected to the Q output 36 of upper register 32, a second input connected to the output of inverter gate 164 and a third input connected to the output 26 of delay gating means 24. The remaining third through seventh stages of the feedback and feed forward gating means 28 have similar gating connections and are not shown in detail. The eighth and last stage of the feedback and feed forward gating means 28 includes and inverter gate 174 whose input is the output 82 and whose input is connected to the $\overline{Q}$ output 64 of the upper register 32. The output of an inverter gate 176 forms the output 98 with the input of inverter gate 176 connected to the output of a three input NAND gate 178 having a first input connected to the Q output 48 of upper register 32, a second input connected to an output 180 from the preceding stage of the feedback and feed forward gating means 28 and a third input connected to the output 26 of the delay gating means 24. The output of NAND gate 178 also forms the input 166 which is connected to an input of the three input NAND gate 164 of the first stage of gating means 28.

Upper register 32 of dual rank shift register 30 includes a first flip-flop having a three input NAND gate 182. The output of NAND gate 182 is connected to an input of a two input NAND gate 184 whose output forms the $\overline{Q}$ output 50 of the first flip-flop. The second input of NAND gate 184 is connected to the output of a two input NAND gate 186 and forms the Q output 34 of the first flip-flop. One input of NAND gate 186 is connected to the $\overline{Q}$ output of gate 184 with the second input of gate 186 being connected to the output of a three input NAND gate 188. The output of NAND gate 188 is also connected to an input of NAND gate 182. A second input of NAND gate 182 is connected to the output of gate 164 in gating means 28 and forms a first feedback path 190. This feedback path 190 also forms a feed forward path from the output of gate 164 to gate 172 in the second stage of the feed forward and feedback gating means 28. The third input of NAND gate 182 is connected to the output 18 of the phase feedback circuity means 16. A first input of NAND gate 188 is connected to the output 166 of gate 178 stage of the feedback and feed forward gating means 28. A second input of NAND gate 188 is connected to the first phase output 18 of means 16. The third input of NAND gate 188 is connected to the output of an inverter gate 192. The second flip-flop of upper register 32 similarly includes a three input NAND gate 194 whose output is connected to an input of a two input NAND gate 196 whose output forms the Q output 52 of the second flip-flop stage. The output of gate 196 is also connected to an input of a two input NAND gate 198 whose output forms the Q output 36 and is also connected to an input of NAND gate 196. The second input of NAND gate 198 is connected to the output of a three input NAND gate 200 and also to a first input of NAND gate 194. A second input of NAND gate 194 is connected to the output 18 of phase feedback circuity means 16 and a third input is connected to the output of gate 172 of the second stage in the feedback and feed forward gating means 28 forming a feedback path 202. A second input of NAND gate 194 is connected to the output 18 of means 16 and also to an input of NAND gate 200. A first input of NAND gate 200 is connected to the output of gate 164 of the first stage of the feedback and feed forward gating means 28 and forms a feed forward path 204. The third input of NAND gate 200 is connected to the Q output 206 of the first flip-flop stage in lower register 34. The third through seventh flip-flop stage of upper register 32 are similarly connected and are not shown in detail.

The eighth and last flip-flop stage of the upper register 32 is similarly connected with the output of a three input NAND gate 208 connected to one input of a two input NAND gate 210. The output of NAND gate 210 forms the $\overline{Q}$ output 64 of the eighth flip-flop stage and is also connected to an input of a two input NAND gate 212 whose output is connected to an input of NAND gate 210. The second input of NAND gate 212 is connected to the output of a three input NAND gate 214 and also to one input of NAND gate 208. One input of NAND gate 214 is connected to the Q output 216 of the seventh flip-flop stage of the lower register 34. A second input of NAND gate 214 is connected to a second input of NAND gate 208 and to the output 18 of phase feedback circuity means 16. The third input of NAND gate 214 is connected to the output 180 which is the feed forward path from the seventh feedback and feed forward gating stage of means 28. The third input of gate 208 is connected to the output of gate 178 which forms a feedback path from the eighth stage of feedback and feed forward gating means 28 to the eighth flip-flop stage in upper register 32.

The lower register 34 of the dual rank shift register 30 includes seven flip-flop stages with the first flip-flop stage having a two input NAND gate 218 whose output is connected to an input of a two input NAND gate 220 and also to an input of a two input NAND gate 222. The output of NAND gate 220 forms the Q output 206 of the first flip-flop stage of lower register 34 and is also connected to an input of a two input NAND gate 224 whose output forms a $\overline{Q}$ output of a first flip-flop stage and is also connected to the second input of NAND gate 220. The second input of NAND gate 224 is connected to the output of NAND gate 222. The second input of NAND gate 222 is connected to an input of NAND gate 218 and also to the output 20 of phase feedback circuity means 16. The second input of NAND gate 218 is connected to the Q output 34 of the first flip-flop stage of the upper register at the output of NAND gate 186.

Similarly to the first flip-flop stage of lower register 34, the second flip-flop stage includes a two input NAND gate 226 whose output is connected to an input of a two input NAND gate 228 and to an input of a two input NAND gate 230. The output of NAND gate 228 forms the Q output 234 of the second flip-flop stage and is also connected to an input of a two input NAND gate 232 whose output is connected to the second input of NAND gate 228. The second input of NAND gate 232 is connected to the output of NAND gate 230. The second input of NAND gate 230 is connected to the output 20 of the phase feedback circuity means 16 and also to an input of NAND gate 226. The second input of NAND gate 226 is connected to the Q output of the second flip-flop stage of the upper register 32 at the output of NAND gate 198. The third through seventh flip-flop stages of the lower register 34 are similarly connected and are not shown in detail.

Referring now to FIG. 1, the eighth flip-flop stages of upper register 32 are 240, 242, 244,246, 248, 250, 252 and 254 respectively. The seven flip-flop stages of the lower register 34 are 256, 258, 260, 262, 264, 266 and 268 respectively. The $\overline{Q}$ outputs of the seven flip-flop stages 256 through 268 are 270, 272, 274, 276, 278, 280 and 282 respectively. The $\overline{Q}$ outputs 270 through 282 are coupled to combining means 284 with combining output 286 being connected to the first flip-flop stage 240 of the upper register 32 at the input of NAND gate 188 of FIG. 2. The combining means 284 as shown in FIG. 2 include the two input NAND gate 192 and a seven input NAND gate 286 whose output is connected to the input of inverter 192. The seven inputs to the NAND gate 287 are the $\overline{Q}$ outputs 270 through 282.

In operation the oscillator stage 10 which is a crystal controlled square wave generator circuit operating at approximately 2 MHZ produces square wave outputs 12 and 14 having inverse phase relationships such that output 14 is 180° difference in phase than output 12. The two oscillator output 12 and 14 drive the phase feedback circuity means 16 which functions as a latch circuit and provides for the mutual exclusivity of outputs 18 and 20 which are also of inverse phase relationship being 180° difference in phase relative to each other. The outputs 18 and 20. therefore, are mutually exclusive such that they may not both be at a high logic level as shown in FIG. 3 at the same instant of time. Any component failures or open or short lead paths that might cause the outputs 18 and 20 to both be of a high logic level are sensed by the phase feedback circuity means 16 with the result that the outputs 18 and 20 will be inhibited from changing state with only one of the two outputs being at a high logic level. The prevention of two simultaneous high logic levels at the outputs 18 and 20 ensures against erroneous sequencing of the upper register 32 and the lower register 34 of the dual rank shift register stage 30.

Output 18, the phase one output of the phase feedback circuity means 16 is effective to right shift the contents of the lower register flip-flop stages 34 by one place to the right into the upper register flip-flop stages 32. The phase one output 18 accomplishes its right shift action designated by arrows such as 290 and 292 in FIG. 1 by means of the connections to NAND gates 188 and 200 in the first two flip-flop stages 240 and 242 of the upper register 32. For example the Q output 206 of the first flip-flop stage 256 of the lower register 34 is shifted through NAND gate 200 to the outputs of the second flip-flop stage 242 of the upper register 32 when the phase one output 18 is a high logic level such as at 294 in waveform 18 in FIG. 3. Similarly output 20 or the phase two output of the phase feedback circuity means 16 places or shifts the contents of the upper register stages 32 into the lower register stages 34 shown as directions 296 and 298 in FIG. 1. The shift from a flip-flop stage of the upper register 32 into a corresponding flip-flop stage in the lower register 34, such as from the first flip-flop 240 of the upper register to the first flip-flop 256 of the lower register, is accomplished by enabling the NAND gates 218 and 222 of the flip-flop stage 256 when the phase two output 20 is at high logic level such as 300 in waveform 20 of FIG. 5. With NAND gates 218 and 222 enabled, the Q output 34 of the first flip-flop stage 240 of upper register 32 is shifted by means of gate 218 to the output 206 of the first flip-flop stage 256 of the lower register 34. The upper to lower shifting of the corresponding flip-flops stages of the upper register 32 and the lower register 34 is similarly accomplished. The combined operation performed by the phase one output 18 and the phase two output 20 during corresponding high logic states, such as 294 and 300 in the waveforms of FIG. 3, accomplishes the upper to lower shift between corresponding flip-flop stages and the right shift placing the contents of a flip-flop in the lower register into the next higher corresponding number flip-flop in the upper register 32. The operation of stage 30 can then be seen to be an eight bit dual rank shift register-counter function by means of combinational and sequential logic techniques. Recirculation from the last flip-flop stage or seventh stage 268 of the lower register 34 is accomplished to recirculate or right shift to the first flip-flop stage 240 of upper register 32 by means of combining means 284 which includes gates 192 and 287. When all the $\overline{Q}$ outputs 270, 272, 274, 276, 278, 280 and 282 are zero, or at a low logic level, combining means 284 enables the first flip-flop stage 240 to produce a high output at its Q output 34 and start the recirculation and right shifting and lower shifting by means of the phase one output 18 and the phase two output 20. The Q outputs 34 through 48 and the $\overline{Q}$ outputs 50 through 64 of the upper register flip-flop stages of upper register 32 can then be seen to generate a sequential train of data pulses coupled to the feedback and feed forward gating means 28 to produce the desired first plurality and second plurality of sequential outputs or wave trains.

The feed forward and feedback gating means 28 combines a delayed gated output 26 of the delay gating means 24 with the outputs 34 through 48 and 50 through 64 of the upper register flip-flops in upper register 32 to produce the first plurality of sequential outputs 68 through 82 which are approximately 500 ns time duration and the second plurality of sequential outputs 84 through 98 which are approximately 400 ns duration. The Q bar output of each flip-flop stage in the upper register such as output 50 of flip-flop 240 is gated directly through a NAND gate such as 160 in the first stage of means 28 to produce the first plurality of outputs such as output 68 shown as 302 in waveform 68 of FIG. 3. The Q output of each flip-flop stage of the upper register 32 such as the output 34 of flip-flop 240 is combined in the corresponding stage of means 28, such as by NAND gate 164 in the first stage with the delay gated output 26, when gate 164 is enabled by feed forward signal 166 to produce an output through inverter 162 at output 84 of the second plurality of sequential outputs that is of 400 ns duration. Output 84 of the second plurality of sequential outputs shown as 304 of waveform 84 in FIG. 3 has its leading edge nearly coincident with the leading edge of the corresponding 500 nanosecond output 302 at output 68. a predetermined delay between the leading edges of pulses 302 and 304 might also be utilized in specific designs by means of delay gating means 24. Similarly in the second stage of feed forward and feedback gating means 28, output 52 of flip-flop stage 242 is coupled through gate 168 to produce pulse 306 of FIG. 3 at output 70 which follows sequentially upon the termination of pulse 302 at output 68 such that pulses 302 and 306 are the first two outputs of the first plurality of sequential outputs of 500 nanosecond time duration. Similarly output 36 of flip-flop 242 is combined by NAND gate 172 with the delay gated signal 26 and feed forward signal 204 and then coupled through gate 170 to produce output pulse 308 at output 86 forming the second pulse of the second plurality of sequential outputs of which pulses 304 and 308 are the first two sequentially related pulses. It will be noted that the corresponding second pulses of the first and second plurality of sequential outputs 306 and 308 have nearly coincident leading edged 310 and 312 as shown in FIG. 3. Similarly the corresponding third through eighth sequential outputs 72 through 82 of the first plurality of outputs and 88 through 98 of the second plurality of outputs have similar time relationships extending in time with the eighth output of the first sequential train shown as 314 of the waveform and terminal 82 in FIG. 3. The corresponding eighth output of the second plurality of sequential outputs is pulse 316 of the waveform at terminal 98 shown in FIG. 3 with the leading edges 318 of pulse 314 and 320 of pulse 316 being nearly coincident. As the dual rank shift register recirculates, the first and second plurality of sequential outputs is again generated with pulse 322 of the waveform at terminal 68 and pulse 324 of the waveform at terminal 84 being generated with nearly coincident leading edges.

The delay gating means 24 generates the delay gated output 26 necessary for timing the second plurality of sequential outputs to be of 400 nanosecond time duration and an alternate leading edge delay by means of combining gate 150 and the delay line 144. The delay line 144 has characteristice such that a signal input on line 22 is delayed by approximately 150 nanoseconds when outputed at terminal 152. Correspondingly the output at 146 is delayed by 30 nanoseconds and the output at 148 by approximately 120 nanoseconds. The combination of the 30 nanosecond delayed signal 146 and the 120 nanosecond delayed signal 148 at output 26 through gate 164 together with the delay tolerances of the logical circuity involved creates an output pulse 84 of approximately 400 nanosecond time duration. This yields the desired result of the second plurality of sequential outputs terminating before the corresponding pulse in the first plurality of sequential outputs such that the pulses in the first plurality of sequential outputs are of a first predetermined time duration and the pulses in the second plurality of sequential outputs are of a second predetermined time of a shorter duration than the first predetermined time duration.

The interconnections of the feedback and feed foward gating means 28 with the adjacent stages of the means 28 and the flip-flop stages in the upper register 32 accomplish a novel feed forward and feedback arrangement so as to cause self-inhibiting of the clock distribution circuit whenever erroneous outputs in terms of timing and levels would occur due to various component and lead path failures. In terms of a typical stage in the feedback and feed forward gating means 28 such as the second stage, a first feed forward connection 204 from the output of gate 164 to the input of gate 200 prevents the right shifting action from flip-flop 256 to flip-flop 242 from occuring and thereby disables the clock distribution circuit from advancing beyond the first stage if the output of gate 164 does not indicate that the first pulse of the sequential train has not yet terminated. Further a second feed forward connection of lead 204 at the output of gate 164 to the input of gate 172 prevents the second output pulse of the sequential train from occuring in case an erroneous output or open circuit condition is present at the preceding or in this case the first stage which prevents an undesirable failure mode. Feedback connection 202 from the output of gate 172 to the output of gate 194 and flip-flop 242 prevents the resetting of the flip-flop when the output of gate 172 is at an improper level indicatin a failure mode. Such a failure mode might be a sustained high level output at 86 with the corresponding low level at the output of gate 172 indicating that the second sequential pulse had never terminated and has remained a high level before the corresponding flip-flop such as 242 in this case was reset to produce a high level in the second sequential time slot. Therefore in addition to the first two feed forward connections providing their degree of falut mode protection, the feedback connection, such as 202 in the second stage, prevents the recirculation of the clock distribution circuit beyond a faulty stage. Therefore the clock distribution operation will be inhibited, with this condition being detected by the logic circuity that is being fed by the clock distribution circuit.

The clock distribution circuit of the present invention provides novel feedback and feed forward arrangements to detect various failure modes in the entire circuity and is self inhibiting so as not to produce any further faulty outputs in its first and second plurality of sequential pulse train outputs which provide precision timing data to external logic circuitry. The use of several feedback and feed forward connections at each of various stages of the circuity allows for self inhibiting due to numerous failure modes at many points in the clock distribution circuit. Such failure modes may be open or short conditions of logic gates or opened or shorted lead paths in the interconnections.

Whereas the preferred form of the invention has been shown and described herein, it should be realized that there may be many modifications, substitutions and alterations thereto without departing from the teachings of the invention.

Having described what is new and novel and desired to secure by letters patent, what is claimed is:

1. A clock distribution circuit for generating a first plurality of consecutive timing pulse outputs, each of a first predetermined time duration and a second plurality of sequential timing pulse outputs, each of a second predetermined time duration that is shorter than said first predetermined time duration with the leading edge of each timing pulse of said first and second plurality of outputs occuring nearly coincident in time, comprising:

oscillator means for generating drive signals, said oscillator means operating at a predetermined frequency;

phase feedback circuity means for providing two mutually exclusive outputs at a frequency related to said oscillator frequency, said phase feedback circuity means being driven by said oscillator means;

shift register means driven by said two mutually exclusive outputs for providing a sequential train of data pulses at a plurality of outputs;

feed forward and feedback gating means, FFGM, connected to said data pulse outputs for generating said first and second plurality of timing pulse outputs; and delay gating means connected to said phase feedback circuity means and said FFGM for providing a delay signal to said FFGM, said delayed signal being combined with said train of data pulse outputs of said shift register means to generate said first plurality of consecutive timing pulse outputs and said second plurality of sequential timing pulse outputs.

2. A clock distribution circuit as recited in claim 1 wherein said first plurality of consecutive timing pulse outputs and said second plurality of sequential timing pulse outputs each include N pulses, wherein N is an integer greater than 1. and wherein said FFGM and said shift register means each include N stages, each of said N stages of said shift register means generating data pulse output of said sequential train of data pulses and being connected to a corresponding stage of said FFGM, each said stage of said FFGM generating a pulse of said N pulses in each of said first plurality and second plurality of timing pulse outputs.

3. A clock distribution circuit as recited in claim 2 wherein each said stage of said FFGM includes a feed forward connection to the next adjacent stage of said FFGM and a feed forward connection to each next corresponding adjacent stage of said shift register means, said feed forward connections containing information of the logic state of said timing output pulse of said particular FFGM stage in which said feed forward connections originate and being effective to inhibit the adjacent stages of said FFGM and said corresponding adjacent stages of said shift register means from generating output pulses when a fault mode is detected in said FFGM stage in which said feed forward connections originate.

4. A clock distribution circuit as recited in claim 3 wherein each stage of said FFGM includes a feedback connection to the corresponding stage of said shift register means containing information of the logic state of said timing output pulses of said particular FFGM stage in which said feedback connection originates, said feedback connection being effective to inhibit said corresponding stage of said shift register means when a fault mode is detected in said FFGM stage in which said feedback connection originates.

5. A clock distribution circuit as recited in claim 4 wherein each of said N stages of said shift register means includes an upper portion and each of said N stages of said shift register means except the Nth stage includes a lower portion, each of said upper portions and each of said lower portions including a flip-flop logic circuit.

6. A clock distribution circuit as recited in claim 5 wherein a first of said two mutually exclusive outputs of said phase feedback circuity means drives said shift register means to shift the logic output state of said lower portion flip-flop circuits into the next corresponding adjacent upper portion flip-flop circuits.

7. A clock distribution circuit as recited in claim 6 wherein said second mutual exclusive output of said phase feedback circuity means drives said shift register means to shift the logic output state of said upper flip-flop portion into said corresponding lower portion flip-flop.

* * * * *

UNITED STATES PATENT OFFICE

CERTIFICATE OF CORRECTION

Patent No. 3,829,790 Dated 8013074

Inventor(s) MAX S. MACRANDER

It is certified that error appears in the above-identified patent and that said Letters Patent are hereby corrected as shown below:

Column 9, line 36, "delay" should be -- delayed --

Signed and sealed this 5th day of November 1974.

(SEAL)
Attest:

McCOY M. GIBSON JR.
Attesting Officer

C. MARSHALL DANN
Commissioner of Patents

USCOMM-DC 60376-P69
★ U.S. GOVERNMENT PRINTING OFFICE : 1969 O—366-334.